United States Patent
Miyagawa et al.

(10) Patent No.: US 8,210,493 B2
(45) Date of Patent: Jul. 3, 2012

(54) WATER HAMMERLESS VALVE

(75) Inventors: Hideyuki Miyagawa, Osaka (JP); Yuki Shimizu, Daito (JP); Mikio Inoue, Tokyo (JP)

(73) Assignee: Kabushiki Kaisha Fujikin, Osaka (JP)

( * ) Notice: Subject to any disclaimer, the term of this patent is extended or adjusted under 35 U.S.C. 154(b) by 940 days.

(21) Appl. No.: 12/214,408

(22) Filed: Jun. 18, 2008

(65) Prior Publication Data

US 2009/0065718 A1    Mar. 12, 2009

Related U.S. Application Data

(63) Continuation-in-part of application No. PCT/JP2006/315179, filed on Jul. 31, 2006.

(30) Foreign Application Priority Data

Dec. 21, 2005  (JP) .................................. 2005-368730

(51) Int. Cl.
F16K 31/122 (2006.01)
F16K 51/00 (2006.01)

(52) U.S. Cl. ...................................... 251/63.5; 251/285

(58) Field of Classification Search ............... 251/62, 251/63.4, 63.5, 129.11, 129.12, 284, 285, 251/129.19; 137/554
See application file for complete search history.

(56) References Cited

U.S. PATENT DOCUMENTS

| | | | |
|---|---|---|---|
| 5,323,142 A * | 6/1994 | Fain | 340/605 |
| 5,385,328 A | 1/1995 | Hofmann | 251/30.04 |
| 2005/0045235 A1 * | 3/2005 | Kajitani | 137/601.14 |

FOREIGN PATENT DOCUMENTS

| | | |
|---|---|---|
| JP | S58-48479 | 3/1983 |
| JP | S63-135498 | 10/1988 |
| JP | 64-035188 | 2/1989 |
| JP | 5118465 | 5/1993 |
| JP | 5118465 | 6/1993 |
| JP | 2003294165 | 10/2003 |
| JP | 2005325928 | 11/2005 |

OTHER PUBLICATIONS

KR Application No. 20087015010, Office Action dated Jan. 12, 2012 (English translation).

* cited by examiner

*Primary Examiner* — John Rivell
*Assistant Examiner* — Time Aigbe
(74) *Attorney, Agent, or Firm* — Larry E. Henneman, Jr.; Henneman & Associates, PLC

(57) ABSTRACT

A water hammerless valve includes a pneumatically-operated valve having a valve disc for opening and closing a fluid channel by moving upward and downward through a pneumatic actuator operation, and a limiting mechanism for interfering with upward movement of the valve disc when the water hammer occurs. The limiting mechanism includes a stepping motor including a rotation shaft fixed on the upper actuator; a vertical movement component connected to the rotation shaft for moving upward and downward via rotation of the rotation shaft; a lower detecting component for detecting the fact that the vertical movement component contacts the upper end of a stem when the lower detecting component moves downward; and a control device for rotating the stepping motor, for controlling the air supply, and for transmitting a stop signal to the stepping motor when the lower end of the lower detecting component detects the fact.

4 Claims, 6 Drawing Sheets

WATER HAMMERLESS VALVE

RELATED APPLICATIONS

This application is Continuation-In-Part Application of International Application No. PCT/JP2006/315179, filed on Jul. 31, 2006, which claims priority of Japanese Patent Application No. 2005-368730, filed on Dec. 21, 2005, the entire content and disclosure of the preceding applications are incorporated by reference into this application.

BACKGROUND OF THE INVENTION

1. Field of the Invention

This invention relates to a water hammerless valve with a pneumatically-operating valve for opening and closing the fluid channel through the pneumatic actuator operation to control opening of a fluid channel caused by the occurrence of a water hammer.

2. Description of the Related Art

It is well known that the water hammer results from a sudden closure of a valve placed in a pipe in which fluid such as water passes. The water hammer causes rapid increase in pressure along upstream from the valve closing point, which results in a pressure wave. The wave is transmitted within the pipe at a constant speed, and it also vibrates the pipe or makes the noise.

When the water hammer occurs in the pipe including the pneumatically-operating valve for opening and closing the fluid channel through the pneumatic actuator operation, a spring provided in the actuator is compressed by the water hammer pressure to move the stem upward. Therefore, the fluid channel is forced to be slightly opened to cause a backward flow of fluid.

An effective method to prevent the fluid channel from opening by the water hammer pressure might be a forcible pressure applied to the stem from upward to interfere the valve opening.

For example, Japanese utility model publication Jitsugan S58-48479 (Jitsukai S59-152255) discloses this kind of a prior art. In the technique disclosed therein, a cylindrical part is provided with a male thread in the upper stem. The cylindrical part is screwed with a bolt, wherein the bolt compresses the upper end of the stem.

However, the technique disclosed therein requires to press the stem with the bolt manually screwed by operators in the field, which results in complicated operation. It is difficult for operators to take immediate responses in an emergency situation.

Japanese utility model publication Jitsugan S63-135498 (Jitsukai H02-56984), on the other hand, discloses another valve comprising a stopper configured to make the valve opening constant, a stopper actuator configured to activate the stopper, and a remote controller configured to transmit a remote signal to the stopper actuator. The stopper presses the upper end of the stem.

The technique disclosed in Japanese utility model publication Jitsugan S63-135498 (Jitsukai H02-56984) is superior to the one in the technique disclosed in Japanese utility model publication Jitsugan S58-48479 (Jitsukai S59-152255) in terms of the remote control availability. However, the disclosed technique is to maintain to open the valve in certain degree in a regular situation. This does not prevent the water hammer pressure from opening the fluid channel when the valve is closed.

In order to solve the above-described problems in the prior arts, the present invention provides a water hammerless valve which automatically prevents the stem from moving upward when the water hammer occurs. Using the water hammerless valve, it is possible to control opening of the fluid channel using the pneumatically-operating valve configured to open and close the fluid channel through the pneumatic actuator operation.

SUMMARY OF INVENTION

One embodiment of the present invention relates to a water hammerless valve comprising; a pneumatically-operating valve comprising a valve disc for opening and closing a fluid channel by moving upward and downward through a pneumatic actuator operation, and a limiting mechanism for interfering upward movement of the valve disc when the water hammer occurs, wherein the limiting mechanism comprising (1) a stepping motor fixed on the upper actuator and including a rotation shaft extending downwardly, (2) a vertical movement component connected to the rotation shaft of the stepping motor for moving upward when the rotation shaft rotates in one rotating direction, and for moving downward when the rotating shaft rotates in the opposite rotating direction, (3) a lower detecting component for detecting the fact that the vertical movement component contacts the upper end of the stem connected to the valve disc when the lower detecting component moves downward, (4) a control device (a) for rotating the stepping motor in one direction when the control device starts air supply to the actuator, (b) for rotating the stepping motor in the opposite direction when the control device stops air supply, and (c) for transmitting a stop signal to the stepping motor when the lower end of detecting component detects the fact.

Another embodiment of the present invention relates to the water hammerless valve further comprising an upper detecting component for detecting the fact that the lower end of the vertical movement component reaches the predefined position higher than the highest position of the upper end of the stem when the vertical movement component moves upward, wherein the control device transmits the stop signal to the stepping motor after said detection.

Yet another embodiment of the present invention relates to the water hammerless valve, wherein the vertical movement component includes a female thread to screw with the male thread fixed to the lower end of the rotation shaft of the stepping motor.

In one embodiment of the present invention, the stem of actuator moves downward, when air supply to the actuator is stopped. At the same time, the rotation shaft of the stepping motor rotates in the reverse direction to make the vertical movement component move downward. When the vertical movement component contacts the upper stem of the actuator, the stepping motor is stopped, as well as the stem of the actuator stops with being pressed by the vertical movement component from the above, which enables to prevent from the stem moving upward and to interfere the fluid channel opening when the water hammer occurs. In addition, when air is supplied to the actuator, the stem moves upward and the rotation shaft of the stepping motor rotates in one direction to make the vertical movement component move upward. Therefore, the vertical movement component does not limit the opening operation of the fluid channel.

In another embodiment of the present invention, the control device enables the stepping motor to stop when the vertical movement component moves upward and the bottom of the component reaches its predefined position higher than the highest position of the upper stem. Thus it is possible to stop the vertical movement component automatically when the vertical movement component is placed in the predefined position not to contact with the upper stem.

Yet in another embodiment of the present invention, a thread mechanism is provided to connect the rotation shaft of the stepping motor and the vertical movement component. Thus it enables the stem not to move upward when a big upward pressure is provided in the stem to limit the fluid channel opening without any failure.

BRIEF DESCRIPTION OF THE DRAWINGS

Hereinafter, preferred embodiments of the water hammerless valve according to the present invention will be described with reference to the drawings.

DETAILED DESCRIPTIONS

Figure 1:
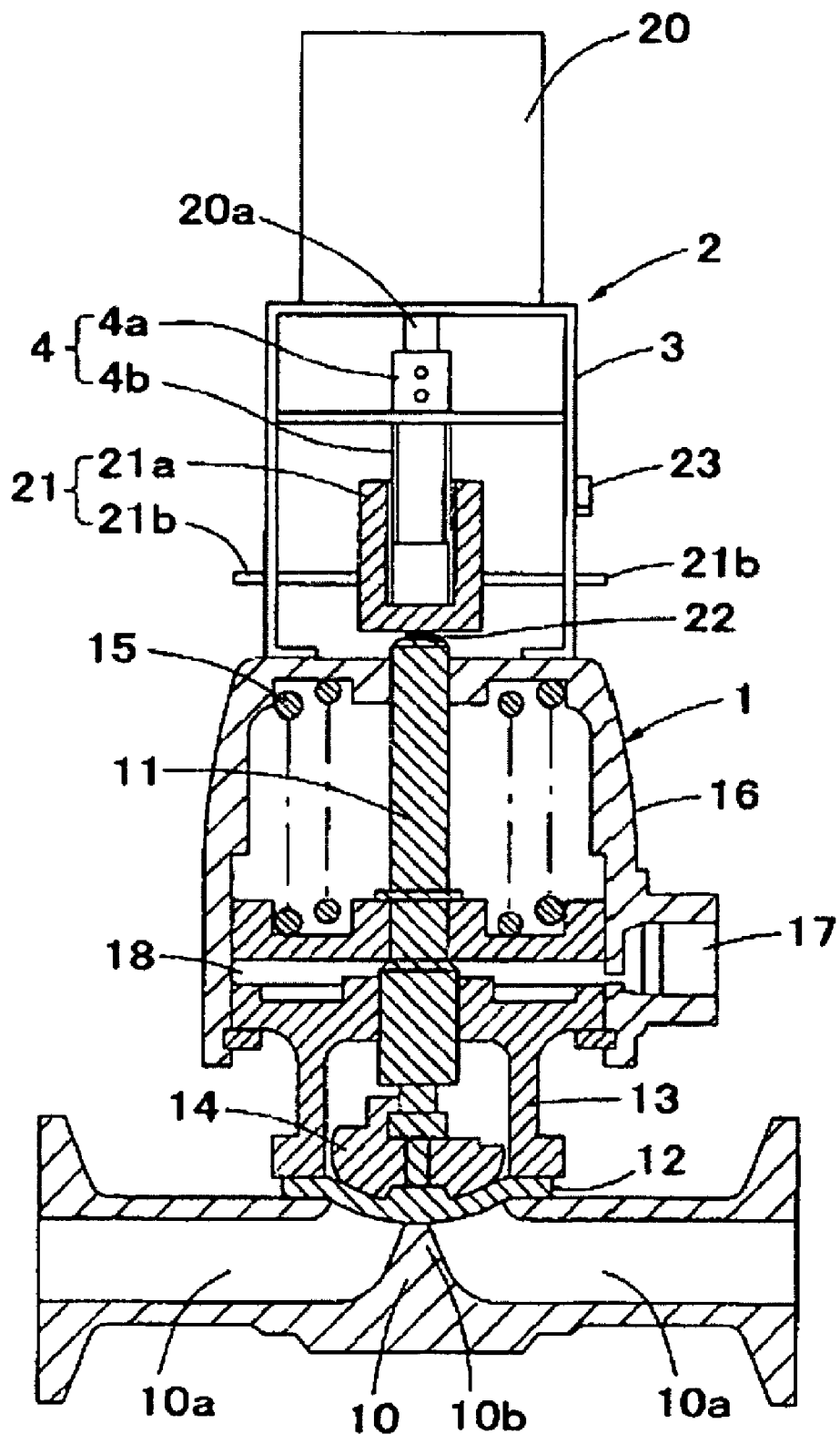
FIG. 1 is a schematic view of the whole water hammerless valve according to the present invention. The valve is in the closed position.
Figure 2:
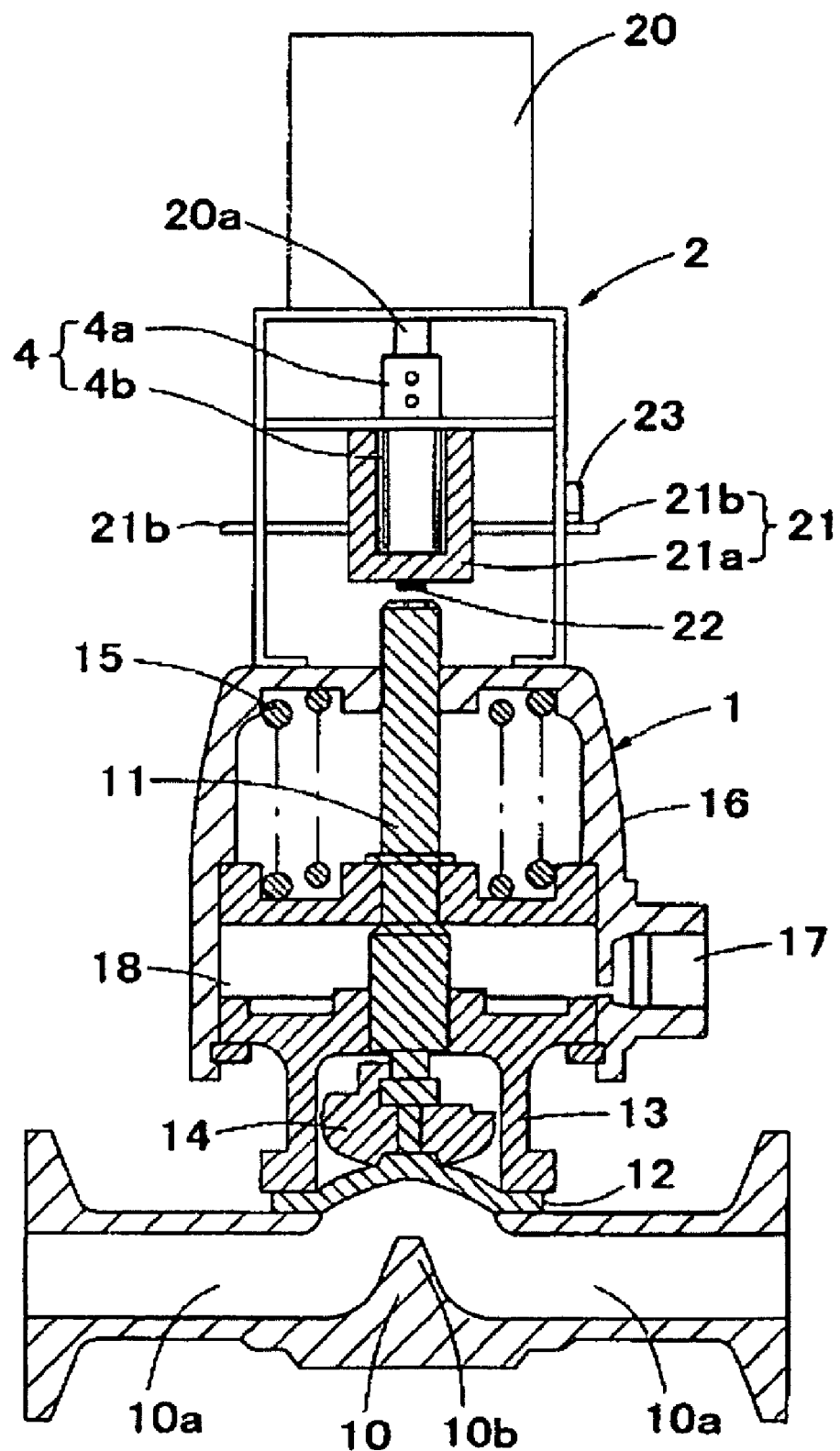
FIG. 2 is a schematic view of the whole water hammerless valve according to the present invention. The valve is in the opened position.

FIGS. 1 and 2 are schematic views of the whole water hammerless valve according to the present invention. FIG. 1 shows the valve in the closed position, and FIG. 2 shows the valve in the opened position.

The water hammerless valve according to the present invention comprises a pneumatically-operating valve (1) provided on the upper valve assembly for opening and closing a fluid channel through a pneumatic actuator operation, and a limiting mechanism (2) for interfering upward movement of the valve disc when the water hammer occurs.

The pneumatically-operating valve (1) has a known structure comprising a valve assembly and a pneumatic actuator. The valve assembly includes a valve body (10), stem (11), valve disc (12), bonnet (13) and compressor (14). The pneumatic actuator includes a spring (15) and cap (16) provided on the upper part of the valve assembly. A fluid channel (10a) and valve seat (10b) are provided on the valve body (10). The cap (16) is provided with an inlet port (17) and an air passageway (18) through which the air (compressed air) is supplied from the inlet port (17) to the bottom of the spring (15).

In the pneumatically-operating valve (1) described above, the spring (15) is compressed by the air pressure introduced into the air passageway (18) when the air is supplied into the cap (16) from the inlet port (17). Then, the stem (11) and compressor (14) which have been compressed downward by the spring (15) move upward to separate the valve disc (12) from the valve seat (10b). Therefore the fluid channel (10a) is opened.

On the other hand, when the air supplying from the inlet port (17) is stopped, the air pressure introduced into the air passageway (18) decreases, and the spring (15) is extended. Then the stem (11) and compressor (14) move downward to contact the valve disc (12) with the valve seat (10b). Therefore the fluid channel (10a) is closed.

Figure 3:
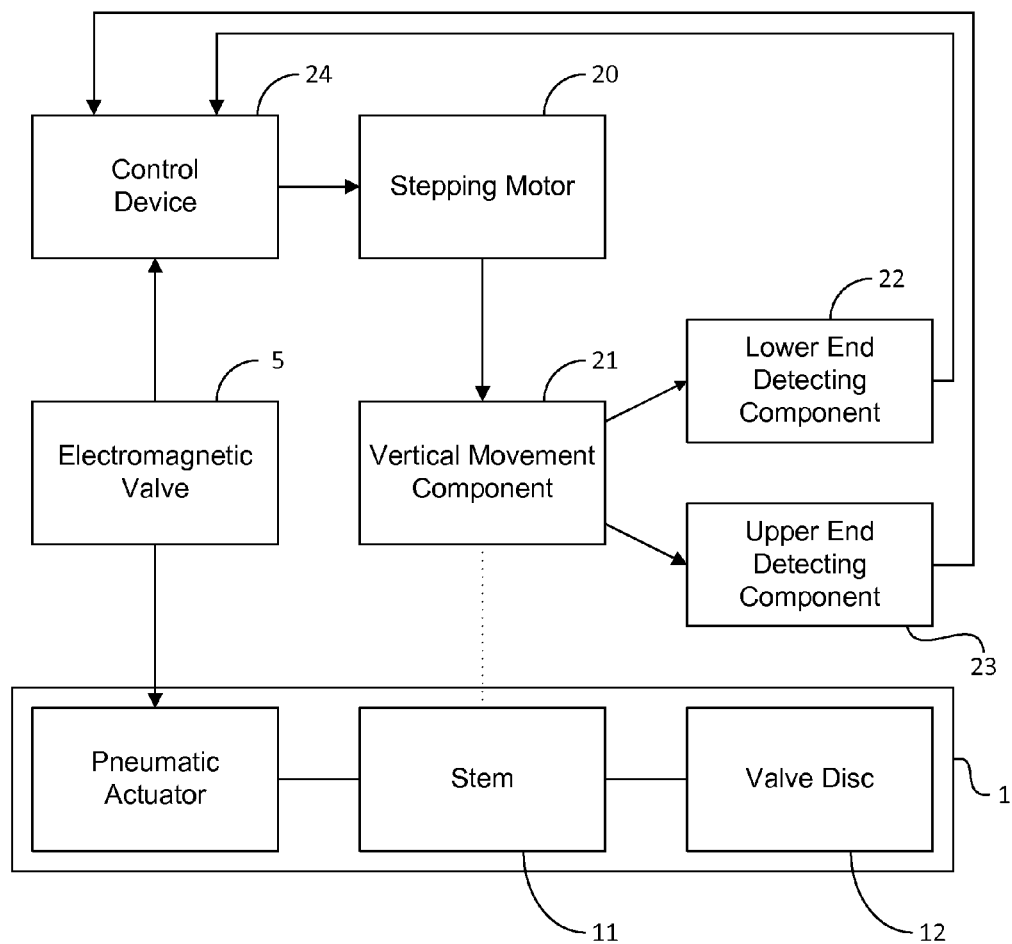
FIG. 3 is a block diagram showing the whole water hammerless valve according to the present invention.

Supplying and stopping air to the pneumatic actuator is switched by an electromagnetic valve (shown in FIG. 3).

Figure 4:
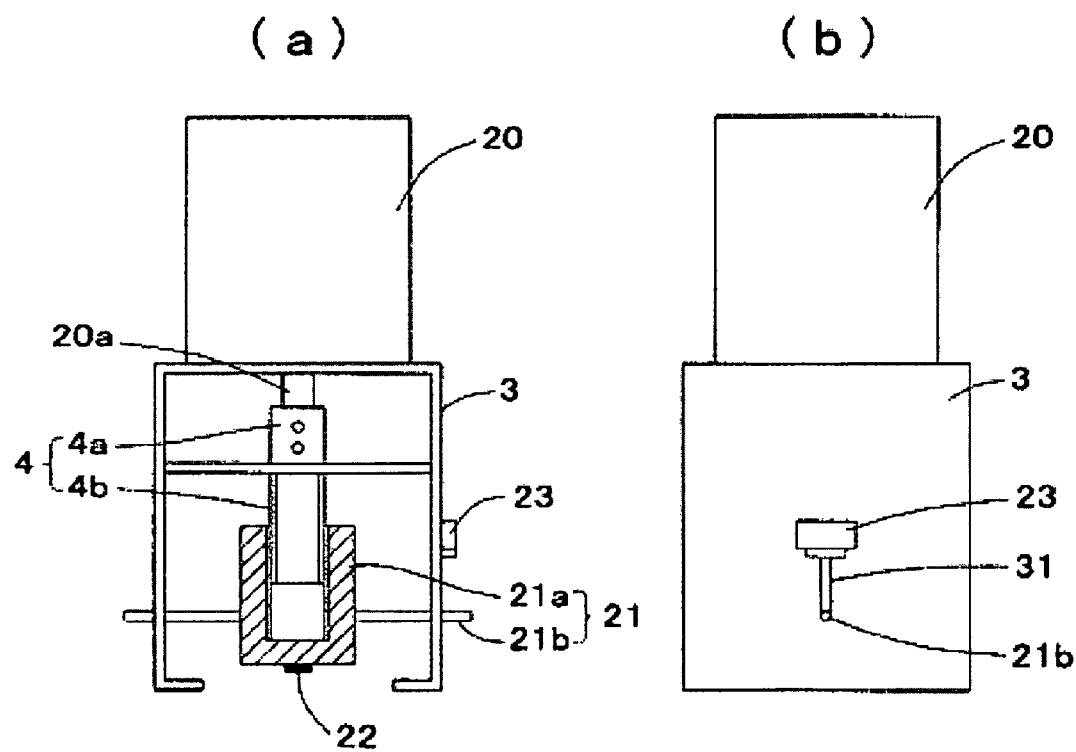
FIG. 4 is an enlarged view of the limiting mechanism extracted from FIG. 1; (a) shows a front view, and (b) shows a side view.

FIG. 3 is a block diagram showing the whole water hammerless valve according to the present invention. FIG. 4 is an enlarged view of a limiting mechanism (2) extracted from FIG. 1. FIG. 4 (a) shows a front view and FIG. 4 (b) shows a side view.

The limiting mechanism (2) comprises a stepping motor (20) fixed on the top of the pneumatic actuator, a vertical movement component (21) provided on a rotation shaft of the stepping motor (20), a lower end detecting component (22) configured to detect arrival of the vertical moving component (21) at the lower end, an upper end detecting component (23) configured to detect the arrival of the vertical movement component (21) at the upper end, and a control device (24) configured to control drive of the stepping motor (20) based on signals from the lower end detecting component (22), the upper end detecting component (23) and the above electromagnetic valve.

The stepping motor (20) is fixed on an upper portion of base (3) which is placed and fixed on the surface of the cap (16) of the pneumatic actuator, wherein the rotation shaft (20a) extends downward and the rotating shaft and the stem of the valve assembly are aligned on the same axis.

A male thread member (4) is fixed on the bottom portion of the rotation shaft of the stepping motor (20) on the same axis of the rotation shaft (20a). The male thread member (4) rotates together with the rotation shaft (20a) of the stepping motor (20).

The upper portion of a male thread member (4) is an attachment (4a) including a hole to which the bottom portion of the rotation shaft (20a) is engaged and fixed. The bottom portion of a male thread member (4) is a male thread part (4b) where the male screw thread is arranged in the outer peripheral wall.

The vertical movement component (21) comprises a cylindrical body with a bottom (21a) where a female thread is arranged in the inner peripheral wall, and a rod (21b) which horizontally extends to the right and left direction from the outer peripheral wall of the cylindrical body with the bottom (21a) so that the rod extending to the right direction is as high as the rod extending to the left direction.

The male thread part (4b) of the male thread member (4) is screwed from upward with the female thread part of the cylindrical body with the bottom (21a). The tips of the right and left rods (21b) are projected laterally from slits (31) provided on the side of the base (3).

The slit (31) provided on the base (3) extends upward and downward. The width of the slit (31) is almost the same as a diameter of the rod (21b). Thus, it enables the rod (21b) only to move vertically along with the slit (31), and enables the cylindrical body with a bottom (21a) integrated with the rod (21b) only to move vertically. Therefore, their rotation is not allowed.

According to the above configuration, when the rotation shaft (20a) of the stepping motor (20) rotates in one direction, it also rotates the male thread member (4) together. As a result, the cylindrical body with the bottom (21a) screws with the male thread member (4) to move the rod (21b) upward together. On the other hand, when the rotation shaft (20a) of the stepping motor (20) rotates in the opposite direction, it also reversely rotates the male thread member (4) together. With their rotation, the cylindrical body with the bottom (21a) is screwed with the male thread member (4) to move the rod (21b) downward together.

The lower end detecting component (22) comprises a contact sensor mounted on the lower end of the vertical movement component (21). The lower end detecting component (22) detects contact of the lower end of the vertical movement component (21) with the upper end of the stem (see FIG. 1), and then transmits the sensing signal to the control system (24).

The upper end detecting component (23) comprises a limit switch mounted on the upper slit (31) on the side of the base (3). The upper end detecting component (23) detects the vertical movement component (21) when it moves upward and the rod (21b) contacts the limit switch, and then transmits the sensing signal to the control system (24).

The determined height of the lower end of the vertical movement component (21) (the upper limit height) is higher than the highest position of the upper end of the stem (11). Thus, the vertical movement component (21) moves upward to the position where the lower end detecting component (22) does not reach the upper end of the stem when the stem (11) is in the highest position (the fluid channel is completely opened).

The control system (24) transmits a control signal to stop the stepping motor (20) when it received the detecting signal from the lower end detecting component (22) and the detecting signal from the upper end detecting component (23).

Thus, the rotation of the rotation shaft (20a) of the stepping motor (20) is stopped, and the vertical movement of the vertical movement component (21) is also stopped.

Furthermore, the control system (24) controls drive the stepping motor (20) based on a signal from the electromagnetic valve (5). Specifically, when the electromagnetic valve (5) is turned on to start air supply to the pneumatic actuator, the control system (24) receives the "on" signal and transmits the control signal to rotate the rotation shaft (20a) of the stepping motor (20) in one direction. Also, when the electromagnetic valve (5) is turned off to stop supplying with air to the pneumatic actuator, the control system (24) receives the "off" signal and transmits the control signal to rotate the rotation shaft (20a) of the stepping motor (20) in opposite direction.

Figure 5:
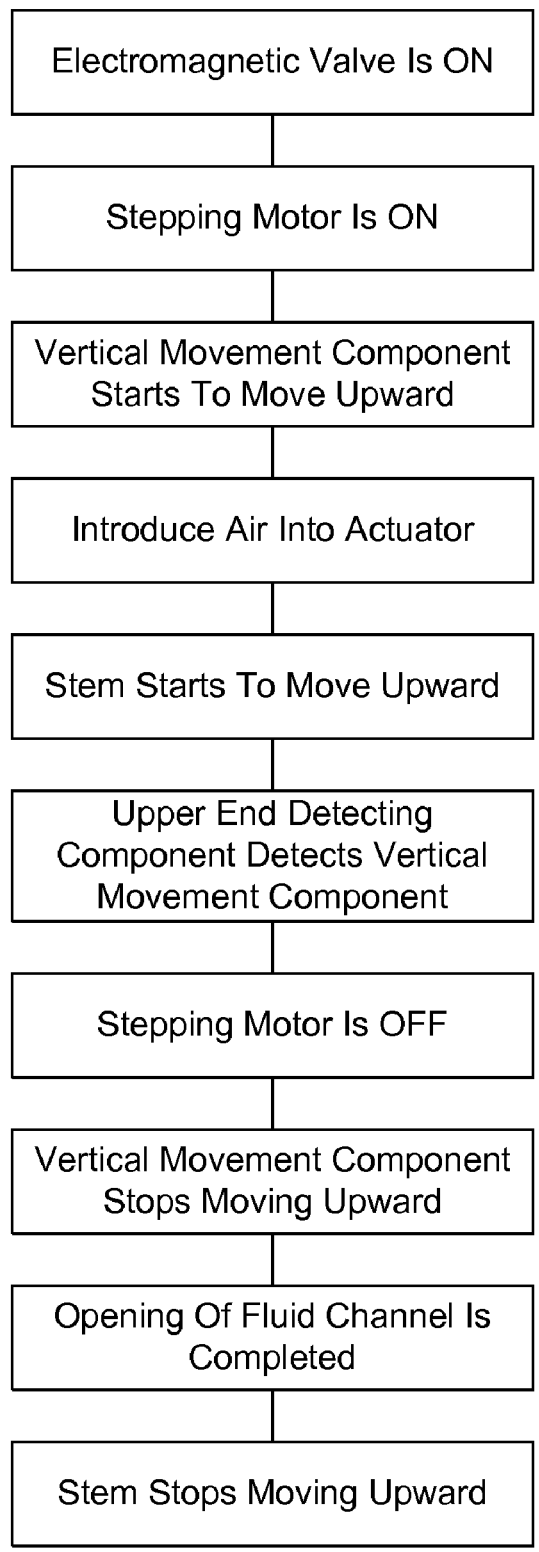
FIG. 5 is a flow chart showing the movement of the water hammerless valve according to the present invention when the valve is in the opened position.
Figure 6:
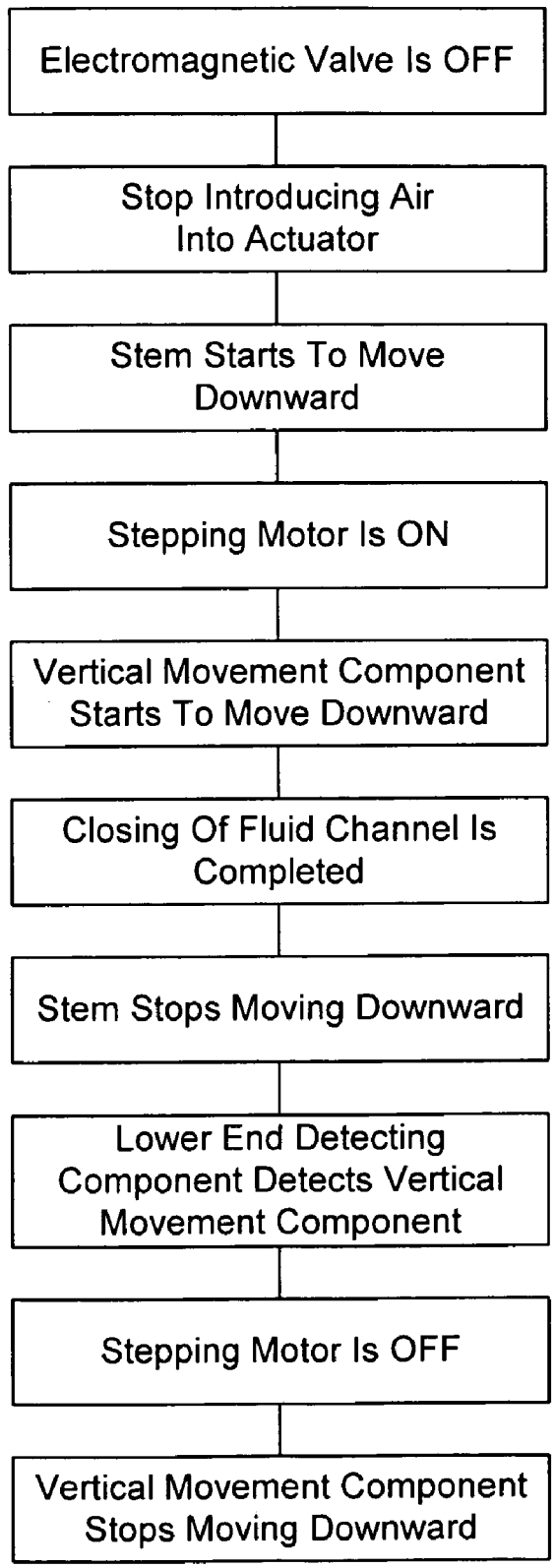
FIG. 6 is a flow chart showing the movement of the water hammerless valve according to the present invention when the valve is in the closed position.

FIGS. 5 and 6 are flow charts showing the water hammerless operation valve according to the present invention.

Initially, the movement of the opened valve will be described with reference to the FIG. 5.

First, when the electromagnetic valve in the initial valve-closed position (see FIG. 1) is turned on, the control signal is transmitted to the stepping motor (20) from the control system (24) after the control device (24) receives a signal from the electromagnetic valve. This enables the rotation shaft (20a) of the stepping motor (20) to start rotating in one direction. Thus the lower end of the vertical movement component (21) starts moving upward apart from the upper end of the stem.

Start of upward movement is delayed a little bit from the stepping motor (20) after the air is started to be supplied to the actuator, and the fluid channel (10a) is opened by the valve disc (12) apart from a valve seat (10b) as the stem (11) moves upward.

The vertical movement component (21) continues to move upward while the stem (21) moves upward.

When the upper end detecting component (23) detects arrival of the vertical movement component (21) at the upper end, the detecting signal is transmitted to the control system (24) from the upper end detecting component (23). After the control system (24) receives the detecting signal, the control system (24) transmits the stop signal to the stepping motor (20). Thus, the rotation shaft (20a) of the stepping motor (20) stops rotating, and the vertical movement component (21) also stops moving upward.

After that, the stem (11) stops moving upward when the opening of the fluid channel (10a) is completed, and opening operation of the valve is terminated. In this state, the lower end of the vertical movement component (21) is apart from the upper end of the stem (11) (see FIG. 2).

Next, the valve operation in the closed position will be described with reference to FIG. 6.

When the electromagnetic valve in the initial valve-opened position (see FIG. 2) is turned off, air supply to the actuator is stopped, and the stem (11) starts moving downward.

Next, the control signal is transmitted from the control system (24) to the stepping motor (20) after the control system (24) receives the signal from the electromagnetic valve, and the rotation shaft (20a) of the stepping motor (20) starts rotating in the opposite direction. Thus, the lower end of the vertical movement component (21) moves downward to be apart from the upper end of the stem.

The stem (21) continues moving downward, and the valve disc (12) contacts the valve seat (10b) to close the fluid channel (10a) (see FIG. 1).

The vertical movement component (21) moves downward after the stem (21) moves downward. When the lower end of the detecting component (22) detects the arrival of the lower end of the vertical movement component (21) at the upper end of the stem, the detecting signal is transmitted from the lower end detecting component (22) to the control system (24). The control system (24) transmits the stop signal to the stepping motor after the control system (24) receives the detecting signal. Thus, the rotation shaft (20a) of the stepping motor (20) stops rotating, and the vertical movement component (21) is also stopped moving downward.

In this state, the lower end of the vertical movement component (21) contacts the upper end of the stem (11). Therefore, it is possible to prevent the stem from moving upward and to control the fluid channel opening when the water hammer occurs.

The technique of the invention may be used to control the opening of a fluid channel caused by the occurrence of a water hammer using a pneumatically-operating valve for opening and closing the fluid channel with an operation of a pneumatic actuator.

What is claimed is:

1. A water hammerless valve comprising:
a pneumatically-operated valve comprising a valve disc for opening and closing a fluid channel by moving upward and downward through operation of a pneumatic actuator, and
a limiting mechanism for interfering with upward movement of the valve disc when the water hammer occurs,
wherein the limiting mechanism comprises
(1) a stepping motor fixed on the top of the pneumatic actuator and including a rotation shaft extending downwardly,
(2) a vertical movement component connected to the rotation shaft of the stepping motor for moving upward when the rotation shaft rotates in one rotating direction, and for moving downward when the rotation shaft rotates in the opposite rotating direction,
(3) a lower detecting component for detecting the fact that the vertical movement component contacts the upper end of a stem connected to the valve disc when the lower detecting component moves downward,
(4) a control device (a) for rotating the stepping motor in one direction when the control device starts air supply to the pneumatic actuator, (b) for rotating the stepping motor in the opposite direction when the control device stops air supply, and (c) for transmitting a stop signal to the stepping motor when the lower end of the lower detecting component detects the fact.

2. The water hammerless valve according to claim 1, wherein the water hammerless valve further comprises an upper detecting component for detecting that the lower end of the vertical movement component reaches a predefined position higher than the highest position of the upper end of the stem when the vertical movement component moves upward, wherein the control device transmits the stop signal to the stepping motor after said detection by the upper detecting component.

3. The water hammerless valve according to claim 1, wherein the vertical movement component includes a female thread to screw with a male thread fixed to the lower end of the rotation shaft of the stepping motor.

4. The water hammerless valve according to claim 2, wherein the vertical movement component includes a female thread to screw with a male thread fixed to the lower end of the rotation shaft of the stepping motor.

* * * * *